Aug. 14, 1945. J. N. TYNAN 2,382,834
LAMINATED TUBING
Filed Oct. 13, 1942
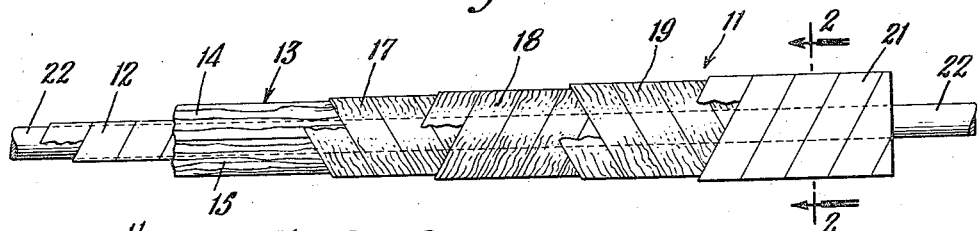
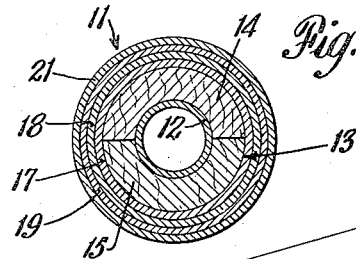
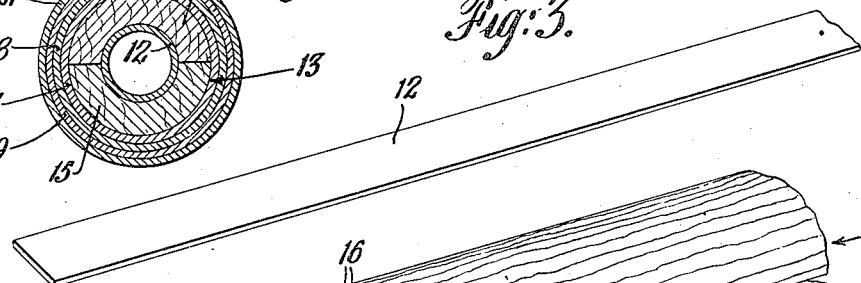
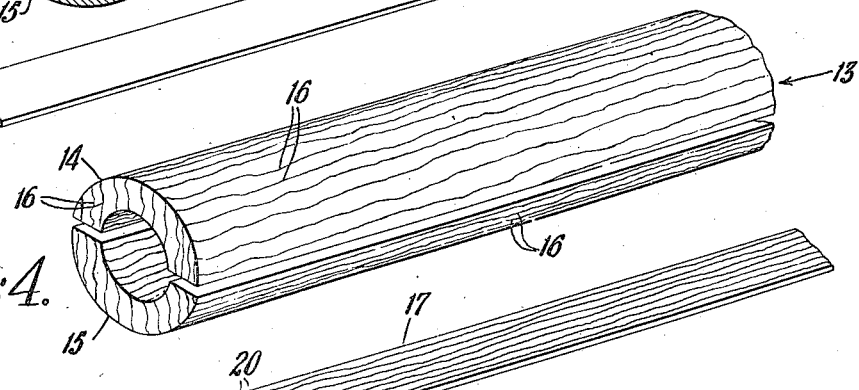
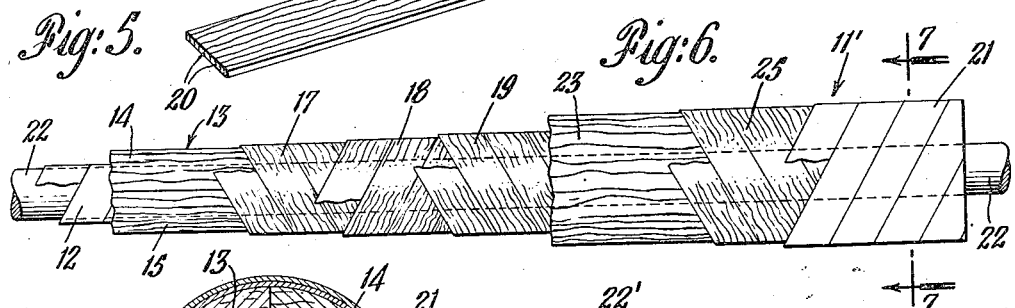
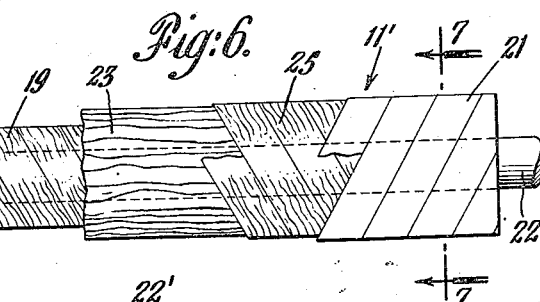
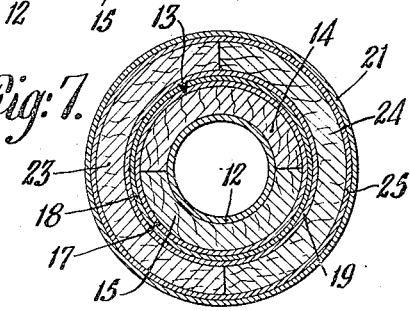
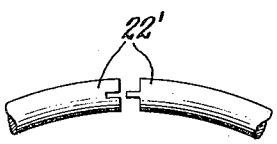
INVENTOR
JAMES N. TYNAN
BY Feyner and Mack
ATTORNEYS Patented Aug. 14, 1945

2,382,834

UNITED STATES PATENT OFFICE 2,382,834

LAMINATED TUBING

James N. Tynan, Chicopee, Mass., assignor to A. G. Spalding & Bros. Inc., Chicopee, Mass., a corporation of Delaware Application October 13, 1942, Serial No. 461,906

13 Claims. (Cl. 138—79)

This invention relates to structural members, particularly tubular structural members of laminated construction.

It is an object of the invention to provide an improved structural member of the above type which is particularly strong and which is adapted for many uses, for example, in airplane and glider construction, as control rods, as insulators, as oil, air or water lines where rigidity and the withstanding of pressure is a requisite, and as shafts for golf clubs and handles and shafts for divers other sporting implements.

It is another object of the invention to provide an improved nonmetallic tubular structural member of laminated construction which may be effectively used in place of metallic members, as of steel, and which may be used in places where because of special requirements metal would not be satisfactory.

A feature of the invention resides in the provision of a tubular member of laminated construction, including laminae of wood so arranged and disposed relative to each other that a structure having great strength per unit of weight is provided.

Another feature of the invention resides in the provision of a tubular member of laminated construction, including superposed laminae of wood, which is particularly strong and which is so constructed that it has a high resistance against splintering, splitting and cracking.

Another feature of the invention resides in the provision of a tubular structural member of laminated construction including spiral wound strip material of wood and of composition fiber and also including at least one cored tubular unit of wood, all of the laminae being adhesively secured together and the several laminae being so formed and so related to each other that a particularly novel and advantageous structure is provided.

Another feature of the invention resides in the provision of the method for making the structural member embodying the subject matter of the above invention.

Other objects, features and advantages will hereinafter appear.

In the drawing:

Figure 1 is a side view of a portion of a tubular member embodying the present invention, certain of the elements being broken away for clarity of illustration, and showing the manner in which the member is built up on a mandrel.

Fig. 2 is an enlarged sectional view taken on the line 2—2 of Fig. 1, with the mandrel removed.

Fig. 3 is a perspective view showing a portion of a composition fiber strip used in the construction.

Fig. 4 is a perspective view showing the half tubular sections used in the construction.

Fig. 5 is a perspective view showing a portion of a wood strip used in the construction.

Fig. 6 is a view similar to Fig. 1, but showing a modification of the present invention.

Fig. 7 is a sectional view, similar to Fig. 2, but taken on the line 7—7 of Fig. 6.

Fig. 8 is a fragmentary view, showing a modified mandrel.

Before describing the present improvements and mode of operation thereof in detail it should be understood that the invention is not limited to the details of construction and arrangement of parts shown in the accompanying drawing, which is merely illustrative of the present preferred embodiments, since the invention is capable of other embodiments, and the phraseology employed is for the purpose of description and not of limitation.

Referring more particularly to the drawing and first to Figs. 1-5, there is shown for the purpose of illustrating the present invention a tubular structural member 11 built up of a plurality of laminae, and including an inner layer made up of a composition fiber strip 12 spirally wound with the longitudinal edges thereof in abutting relation.

A composition fiber strip made from processed highly compressed fibrous stock and sold as Continental fiber by the Continental Diamond Fibre Company of Newark, Delaware, has been used with success in the construction of the structural member embodying the present invention. This Continental fiber is an uncalendered vulcanized fiber using a cotton rag base vulcanized through the medium of zinc chloride. However, it will be readily appreciated that other composition fiber strips may likewise be utilized, which are tough, which do not adversely splinter, and which advantageously and preferably have a hard smooth abrasion resisting surface but with affinity for the adhesive used in bonding the fiber layer to adjacent layers in the structural member 11.

Overlying and adhesively secured to the spirally wound fiber strip 11 is a tubular unit 13 advantageously comprising a pair of half tubular sections 14 and 15 of wood. Of importance, and as shown best in Fig. 4, the sections preferably and advantageously are so cut that they include continuous long grains 16 the full length of the tubing. Thus, in practice these sections 14 and 15 have been made from straight grain wood stock and the continuous long grain is included in the resulting unit 13 in the same manner as though a straight grained rod were bored concentrically to produce a solid wooden tube. A much more accurate formation and disposition of the bore of the resulting unit, however, is possible in the forming of the unit from the sections 14 and 15 than by forming the same by concentrically boring a solid wooden tube. Wall thickness of about 1/8" for the half tubular sections has been used, but this may vary depending upon strength and other characteristics desired.

Spirally wound on the tubular unit is relatively thin strip material of wood, which as shown advantageously includes a plurality of superposed strips 17, 18 and 19, wound with adjacent superposed strips being wound in opposite directions and adhesively secured to each other, and with the innermost strip 17 adhesively bonded to the tubular unit 13 and wound in a direction opposite to that of the inner fiber strip 12.

Of importance the wooden strips, are preferably and advantageously not made from veneer of the conventional rotary cut or sliced variety which has no through continuity of grain, but are made from straight grain planks of prime stock and are cut from the edge at all times so that they are in effect individual boards which, as shown best in Fig. 5, provides a straight strip possessing all of the long grains 20 along its full length and extending continuously through the thickness thereof. Such a strip, it will be appreciated, is not a conventional veneer, and it embodies maximum tensile strength and bending ability. The wood used may be ash, hickory or any other suitable wood, advantageously of a fibrous character.

To complete the structural member, there is a second or outer strip 21 of composition fiber, similar to the inner strip 12, adhesively bonded to the outermost wooden strip 19 and spirally wound thereon in the opposite direction.

The resulting construction, for reasons which will be more fully set forth hereinafter is particularly strong and resistant to splintering, splitting and cracking.

In building up the structural member 11, above described, and as shown best in Fig. 1, there first is wound on a mandrel 22 of the size required for the inside diameter of the completed member 11, a composition fiber strip 12 which may be approximately 1/64" thick and 1" wide, but also may be of other thickness and/or width depending upon the requirements of the particular construction and upon the diameter of the mandrel, as will be readily appreciated. As shown, this inner strip is spirally wound in edge abutting relation. The pitch of the spiral, as shown, has been found satisfactory, but it is to be understood that the pitch used may be determined by the particular size of the mandrel and/or the size of the completed tubular member.

A coating of adhesive is applied to the outer face of the fiber strip, preferably after winding on the mandrel, and, if desired, may be applied to the longitudinal edges of the strip prior to or concurrently with the winding operation. Any suitable adhesive may be used, for example, hot animal glue, casein, cold setting or hot press resin of the urea formaldehyde type, or any other adhesive making a satisfactory and sufficiently strong bond.

Following the application of the adhesive, there are applied longitudinally the two half tubular sections 14 and 15 having an inside diameter equal to that of the mandrel plus the fiber winding. Advantageously, these two sections also are coated with a suitable and preferred adhesive such as above explained, and clamped tightly in position with the wall comprising the bore of the unit, contacting the spirally wound fiber strip, and with edge walls of the sections in butting relation. Any suitable form of clamping means may be utilized, and the sections are preferably retained positively and tightly clamped relative to each other until the adhesive between the sections and between the sections and the fiber strip, has thoroughly set or dried.

After removing the clamping means from the half tubular sections, a first wooden strip 17 is spirally wound around the sections as shown in Fig. 1, with the strip preferably and advantageously wound in a direction opposite to that of the inner fiber strip 12. A suitable adhesive, such as explained above, is applied to the outer surface of the half sections 14 and 15 making up the tubular unit 13, and preferably also to the inside face of and to the longitudinal edges of the wooden strip. The application of the adhesive, it will be understood, may be accomplished either prior to or concurrently with the winding on the first wooden strip.

Preferably, and as shown, additional wooden strips 18 and 19 are applied in the same manner as the first wooden strip 17, with the adhesive being applied either prior to or concurrently with the winding operation. Advantageously and as shown, each of the additional strips is wound in a direction opposite to that of the underlying strip. The thickness and width of the wooden strip material may vary depending upon the size of the tubular member being made and/or upon the particular physical properties desired. For example, the strip material may have a thickness of 3/32" and a width of 1", or it may have a thickness of 1/16" and a width of 2", or some other width and thickness depending upon the requirements of the manufacture.

After the last wooden strip 19 has been wound in position, a final or outer composition fiber strip 21, like the inner strip, is spirally wound thereon, advantageously in an opposite direction as shown, and with adhesive applied to the inner face and, if desired, to the longitudinal edges thereof prior to or during the winding operation.

The winding of the several fiber and wooden strips may be accomplished through the use of any suitable and conventional means for winding strip material, either by the revolving of the mandrel, or by utilizing an apparatus and method involving the rotating of the strips around a stationary mandrel.

Advantageously the winding is done under tension and this tension normally will serve to produce the necessary clamping effect. However, if desired a suitable clamping means, such as a tubular clamp, may be applied over the completed structural member until the adhesive has fully set. Completing the steps in the making of the structural member, the mandrel 22 is removed from the center thereof.

In a structural member 11, constructed in the manner above set forth, the inner fiber strip 12, securely bonded to tubular unit 13, serves to prevent and/or very effectively resist splintering or splitting of the wood thereof in impact or shock strains, and, in addition, provides a smooth and true inner bore for the structural member. The half sections making up the tubular unit 13, being formed from straight grain stock providing continuous long grain the full length thereof, provide strength and dispose grain running longitudinally of the completed structural member.

The subsequent wooden strips, with the grain running longitudinally and through the thickness thereof, which are wound in reverse directions, provide a diagonal criss-crossing of the grains in the several wood strips and the longitudinal grain of the underlying half tubular sections, and serve not only to prevent the long grains of the half sections from splitting, tearing and splintering, but also to strengthen each other due to the varying direction of their wrap and of the grain.

The outer fiber strip 21 adds appreciably to the tensile strength of the outer wood wrapping, again preventing splitting, splintering and tearing, and moreover, provides the finished structural member with a hard, smooth, abrasion resisting surface which at the same time has an affinity for the adhesive used so that it will permit the ready and effective bonding of the member inside a member of larger diameter or to any surface of the same radius.

If desired and as shown in Figs. 6 and 7, a structural member 11' of modified construction embodying the principles of the present invention may be employed. This modified construction, which is particularly applicable to tubular members of larger diameter, is essentially the same as the construction of the member 11 shown in Figs. 1 and 2, differing therefrom in the incorporation of at least one additional pair of tubular half sections 23 and 24 of construction like the half sections 14 and 15, disposed intermediate an underlying section made up of spirally wound wooden strip material which, as shown, includes strips 17, 18 and 19 the same as the wooden strips embodied in the construction of Figs. 1 and 2, and an overlying section of spirally wound wooden strip material which, as shown, may include one strip 25 exactly the same as the strips 17, 18 and 19. As in the construction of Figs. 1 and 2, an outer strip 21 of composition fiber is spirally wound to provide the outer surface of the structural member and is adhesively bonded to the underlying portion of the structural member.

It will be readily appreciated that the application of the additional half sections 23 and 24 and of the additional wooden strip 25 may be accomplished in a manner similar to the previously applied half sections 14 and 15 and strips 17, 18 and 19, with all of the laminae making up the completed member being adhesively bonded together. Also, it will be appreciated that the number of layers of wooden strips both overlying and underlying the outer pair of half sections may be varied with respect to the number illustrated in the drawings, and that under certain conditions the outer wooden strip 25 may be omitted.

Of special importance, however, it is to be noted, as shown best in Fig. 7, that the joints between the outer pair of half tubular sections 23 and 24 are offset circumferentially with respect to those between the inner pair of half sections 14 and 15, so as preferably to be located midway therebetween.

Where tubular members of a curved shape of any desired radius are required, the procedure as described above in connection with Figs. 1-7 may be followed except that pre-curved half tubular sections may be used and except that a mandrel 22' is preformed to the desired curve and may be made up to separate in the middle as shown in Fig. 8, to permit removal from either end of the tubing.

While the inner and outer fiber tubes, as above described, preferably are formed of spirally wound strips, they may also be formed of preformed tubing of the same composition as the fiber strips. The illustration of this construction in cross-section is exactly the same as the showing of the tubes using spirally wound fiber strips pictured in Figs. 2 and 7. The manner of forming the complete tubular members using preformed fiber tubes would be the same as that of the tubular members first described except that the preformed fiber tubes would be slipped into position instead of spirally wrapped in position.

Variations and modifications may be made within the scope of this invention and portions of the improvements may be used without others.

Having thus described the invention, what is claimed as new is:

1. A tubular structural member comprising an inner spirally wound fiber strip; a wooden tubular unit on and adhesively secured to said spirally wound fiber strip; a plurality of superposed strips of wood having longitudinally extending grain, spirally wound on said tubular unit and adhesively secured to the latter and to each other; and a spirally wound fiber strip on and adhesively secured to the outermost of said superposed wooden strips.

2. A tubular structural member, including a spirally wound fiber strip; a wooden tubular unit on and adhesively secured to said fiber strip, said tubular unit having continuous long grain extending longitudinally thereof; spirally wound wooden strip material on and adhesively secured to said tubular unit in edge-abutting relation; and a spirally wound fiber strip on and adhesively secured to said spirally wound wooden strip material.

3. A tubular structural member, including an inner spirally wound composition fiber strip; a cored tubular unit of wood on and adhesively secured to said fiber strip, said cored tubular unit being formed to provide continuous long grain extending longitudinally thereof; a plurality of strips of wood respectively spirally wound in opposite directions and in edge abutting relation, on said tubular unit, the inner one of said wood strips being adhesively secured to said tubular unit, and adjacent of said superposed strips being adhesively secured to each other, said superposed wood strips being formed with the grain running longitudinally thereof and extending continuously through the thickness thereof; and an outer composition fiber strip spirally wound on and adhesively secured relative to said underlying plurality of spirally wound wood strips.

4. A tubular structural member including an inner spirally wound composition fiber strip; a first cored tubular unit of wood on said fiber strip; spirally wound wood strip material on said tubular unit in edge-abutting relation; a second cored tubular unit of wood on said wood strip material; and an outer spirally wound composition fiber strip on said second tubular unit, all of said superposed elements being adhesively secured relative to each other.

5. A tubular structural member comprising radially spaced inner and outer spirally wound fiber strips having the characteristics of toughness and freedom from splintering and having a hard smooth abrasion resisting surface; and an intermediate structure adhesively bonded to said fiber strips, including a tubular unit of wood divided circumferentially into a plurality of transversely related sections extending longitudinally of the structural member, and spirally disposed strip material of wood on and adhesively bonded to the tubular unit, said strip material of wood being in edge-abutting relation and having continuous long grain extending longitudinally and through the thickness thereof to be disposed spirally of said tubular unit and said structural member.

6. A laminated tubular structural member comprising radially spaced inner and outer layers of spirally disposed strip material having the characteristics of toughness and freedom from splintering and having a hard smooth abrasion resisting surface; and an intermediate structure adhesively bonded to said inner and outer layers, including a tubular unit made up of a plurality of longitudinally disposed and circumferentially related segmental sections of wood, said sections having continuous long main grain running longitudinally thereof and extending in generally parallel relation through the thickness of the sections in the manner of straight grain wood stock, and spirally disposed strip material of wood on and adhesively bonded to said tubular unit, said strip material of wood being in edge-abutting relation and having the grain extending longitudinally and through the thickness thereof to be disposed spirally of the grain of said tubular unit.

7. A laminated tubular member comprising inner and outer layers of fiber strip material; and an intermediate structure adhesively bonded thereto, including a first tubular unit of straight grain wood with the grain running longitudinally thereof, first spirally wound strip material of wood on said first tubular unit, a second tubular unit of straight grain wood with the grain running longitudinally thereof, on said first strip material of wood, and second spirally wound strip material on said second tubular unit, said first and second spirally wound strip material of wood having long edge grain running longitudinally thereof and spirally disposed relative to the grain of said first and second tubular units.

8. A plywood structure comprising an inner and outer spiral layer of edge grain wood having the grain extending longitudinally of the strip with the spirals in edge-abutting relation; and an intermediate section comprising at least one tubular unit made up of a plurality of longitudinally disposed and circumferentially related segmental sections of wood, said sections having continuous long main grain running longitudinally thereof and extending in generally parallel relation through the thickness of the sections in the manner of straight grain stock, the inner and outer layers and intermediate layer being adhesively bonded together into a rigid structure.

9. A plywood structure comprising an inner and outer spiral layer of edge grain wood having the grain extending longitudinally of the strip with the spirals in edge-abutting relation; and an intermediate section comprising a plurality of tubular units, each made up of a plurality of longitudinally disposed and circumferentially related segmental sections of wood, with the joints of the sections in one unit offset with respect to the joints in the other unit, said sections having continuous long main grain running longitudinally thereof and extending in generally parallel relation through the thickness of the sections in the manner of straight grain stock, the inner and outer layers and intermediate layer being adhesively bonded together into a rigid structure.

10. A tubular structure including a tubular wooden core having the grain extending longitudinally thereof; and a spirally wound strip of wood having the turns thereof in edge-abutting relation and adhesively bonded together and to the core, said strip of wood having continuous edge grain therein extending throughout the thickness thereof and longitudinally thereof and disposed in spiral relation to the grain of the tubular core.

11. A tubular structure including a tubular wooden core having the grain extending longitudinally thereof, said core comprising a plurality of longitudinally extending sections adhesively secured together; and a spirally wound strip of wood having the turns thereof in edge-abutting relation and adhesively bonded together and to the core, said strip of wood having continuous edge grain therein extending through the thickness thereof and longitudinally thereof and disposed in spiral relation to the grain of the tubular core.

12. A tubular structure including a tubular wooden core having the grain extending longitudinally thereof, said core comprising a plurality of pairs of half tubular wood sections, said pairs of sections being so disposed relative to each other that the joints between one pair are circumferentially offset relative to the joints between another pair; and a spirally wound strip of wood having the turns thereof in edge-abutting relation and adhesively bonded together and to the core, said strip of wood having continuous edge grain therein extending through the thickness thereof and longitudinally thereof and disposed in spiral relation to the grain of the tubular core.

13. A tubular structure including a tubular wooden core having the grain extending longitudinally thereof; and spirally wound strips of wood having the turns thereof in edge-abutting relation and adhesively bonded together and to the core, said strips of wood being wound in opposite directions and each having continuous edge grain therein extending through the thickness thereof and longitudinally thereof and disposed in spiral relation to the grain of the tubular core.

JAMES N. TYNAN.